United States Patent [19]
Ray

[11] Patent Number: 5,987,814
[45] Date of Patent: Nov. 23, 1999

[54] FLORAL DISPLAY HOLDER

[75] Inventor: James E. Ray, Brantford, Canada

[73] Assignee: Floral Ever Fresh Products Inc.

[21] Appl. No.: 09/092,613

[22] Filed: Jun. 5, 1998

[51] Int. Cl.⁶ ........................................... A01G 5/00
[52] U.S. Cl. .............................................. 47/41.12
[58] Field of Search .................... 47/41.1, 41.01, 47/41.12, 41.13, 79, 48.5

[56] References Cited

U.S. PATENT DOCUMENTS

| | | |
|---|---|---|
| 3,127,698 | 4/1964 | Smithers . |
| 3,962,825 | 6/1976 | O'Connell . |
| 4,058,929 | 11/1977 | O'Connell . |
| 4,858,381 | 8/1989 | Walton et al. . |
| 4,884,364 | 12/1989 | Ferris . |
| 5,044,118 | 9/1991 | Ferris . |
| 5,146,709 | 9/1992 | Iseki . |
| 5,315,787 | 5/1994 | Scheicher et al. ........................ 47/79 |
| 5,588,253 | 12/1996 | Broodley et al. ....................... 47/41.12 |
| 5,693,380 | 12/1997 | O'Connell . |
| 5,813,605 | 9/1998 | Chou .................................... 47/48.5 X |

FOREIGN PATENT DOCUMENTS

| | | |
|---|---|---|
| 2541075 | 8/1984 | France . |
| 6225829 | 8/1994 | Japan . |
| 8902952 | 6/1989 | Netherlands . |
| 3099 | of 1898 | United Kingdom . |
| 2 240 249 | 7/1991 | United Kingdom ....................... 47/79 |

*Primary Examiner*—Michael J. Carone
*Assistant Examiner*—Jeffrey L. Gellner
*Attorney, Agent, or Firm*—R. Craig Armstrong

[57] ABSTRACT

A floral display holder to be used on a funeral casket has a hollow body with an inclining recess for receiving water-absorbing foams, and a manual pump to draw water from a lower portion defining a liquid reservoir. The floral display holder has U-shaped clips to secure the foams generally against an inclined floor surface of the recess. The water drawn with the pump is directed onto the foam, thereby replenishing the foam with additional water.

8 Claims, 9 Drawing Sheets

FLORAL DISPLAY HOLDER

BACKGROUND OF THE INVENTION

1. Field of the Invention

This invention relates to floral display holders. In particular, the invention is directed towards a floral display holder resting on top of a funeral casket displaying the floral arrangement in an inclined elevation. Of course, the floral display holder described herein may be used in other circumstances as well as funeral caskets where the inclination of the floral arrangement is desired.

2. Description of the Prior Art

Many floral display holders today utilize a water-retaining foam (hereinafter referred to as the "floral foam" or foam") to attach flowers thereon in a desired arrangement and at the same time provide water to the stems of the flowers to prevent wilting. Prior to piercing the floral foam with the desired flower arrangement, the floral foams are saturated with water. The foams are then placed onto a floral display holder and locked into place by retaining clips. The floral foam when fully saturated retains approximately five cups of water. Despite this initial saturation the floral foam gradually dries as a result of both evaporation into the ambient air and absorption by the flower arrangement.

The floral display holder of the inclined double-dept saddle variety displays a floral arrangement by resting on top of a funeral casket. It is desired that the floral foams are inclined towards the audience so as to heighten the quality view of the floral arrangement. Generally, at least two foams sit side by side along their length. In some prior art, it is taught that at least one foam must be trimmed before inserting it into the housing of the floral display holder. Once a wedge-like portion is removed with a knife, the foam is inserted into the holder alongside an uncut foam. The prior art allowed only the foam nearest to the front area of the displayer holder ("front foam") to be inclined while the rear foam remained horizontal. As a result of trimming the front foam and inclining the floor surface area just below the front foam a desired inclination of the front foam was achieved. The overall appearance of this layout is known as a 'cascade' display. However, there remained the problem that labour was needed in trimming the foam and that only one foam was inclined. Morever, because the prior art taught one foam being inclined while the other remained horizontally disposed, occasionally the foams did not abut continuously throughout their length either because of poor trimming or because of saturation of the front foam tending to sway the foam away from the horizontally disposed foam.

In the case of a floral display holder of the inclined double-depth saddle variety, there is generally more than one foam utilized in the holder; therefore, there is additional surface area for ambient air to come into contact with the foam because more than one foam is generally used. This would inherently increase the evaporation rate of the water in the foam. Further, when the foam is in an inclination, the force of gravity causes a gradual migration of the water retained in the foam to migrate from the upper portions of the foam to the bottom. As the inclination from the horizontal increases, the migration becomes more exaggerated. As the flowers inserted in the now dried-up portion may wilt earlier than those flowers inserted at the moister bottom portion of the foam. Currently, a user must, therefore, occasionally attend the floral display arrangement with a watering vessel in hand to re-saturate the floral foam. When water is simply added to the top portion of the floral foam, excess water begins to undesirably accumulate in the lower portion near the bottom of the foam. In U.S. Pat. No. 4,058,929 to O'Connell, there is at least one aperture along the connecting edge of the upper bottom wall and the lowermost side wall to drain this excess water into the hollow interior of the product.

However, currently available inclining floral display holders fail to address the need to conveniently re-saturate a dried foam without a watering vessel. Morever, a completed flower arrangement is difficult to handle, especially when fully loaded. A completed flower arrangement may weigh in the range of 40 to 50 pounds; therefore, a means to comfortably transport the holder is desired.

SUMMARY OF THE INVENTION

It is an object of the invention to overcome some of the drawbacks and disadvantages of currently available inclined floral display holders.

It is another object of the invention to provide for inclined foams without the need to trim or cut them.

It is another object of the invention to provide for a continuously abutting foams that do not tend to separate from each other even when saturated.

It is another object of the invention to minimize the need for a user to attend the inclined floral display holder with a flower watering vessel to re-saturate the floral foam.

It is another object of the invention to drain and re-circulate excess water accumulating at the bottom end of the inclined foam back to the upper portion of the foam.

It is another object of the invention to allow the user to easily transport by hand a completed flower arrangement.

Further features of the invention will be described or will become apparent in the course of the following detailed description.

BRIEF DESCRIPTION OF THE DRAWINGS

In order that the invention may be more clearly understood, the preferred embodiment thereof will now be described in detail by way of example, with reference to the accompanying drawings, in which.

DETAILED DESCRIPTION OF THE PREFERRED EMBODIMENT

Figure 1:
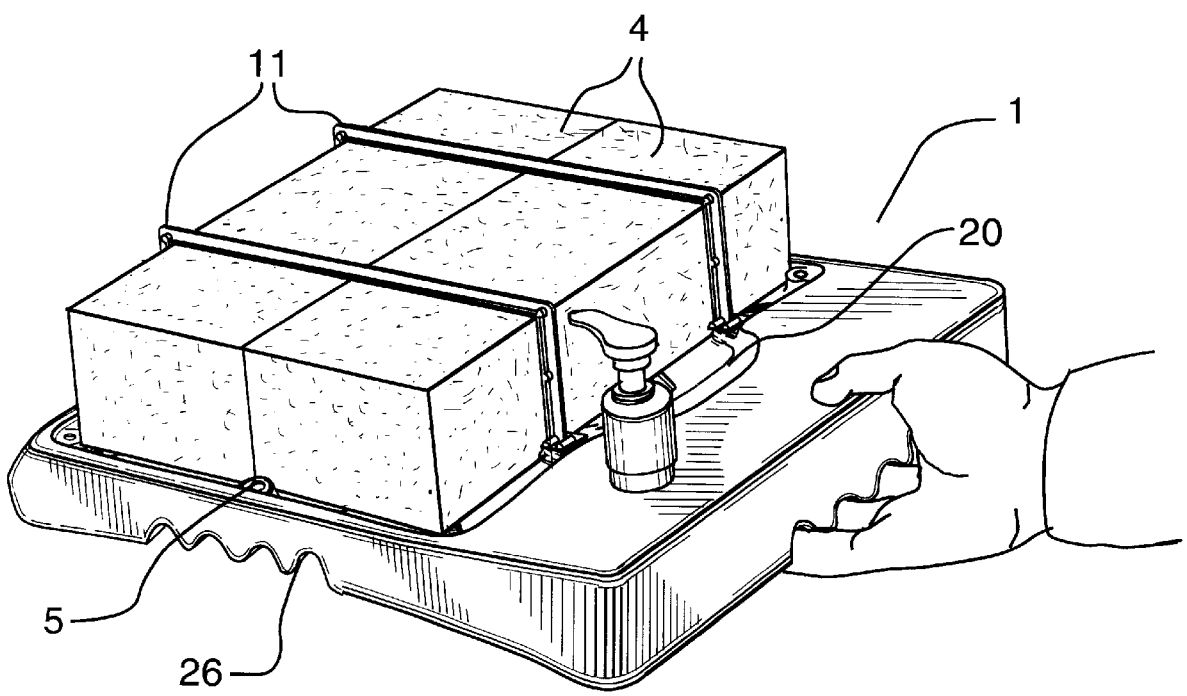
FIG. 1 is a perspective view of the display holder with two floral foams and U-clips attached.
Figure 2:
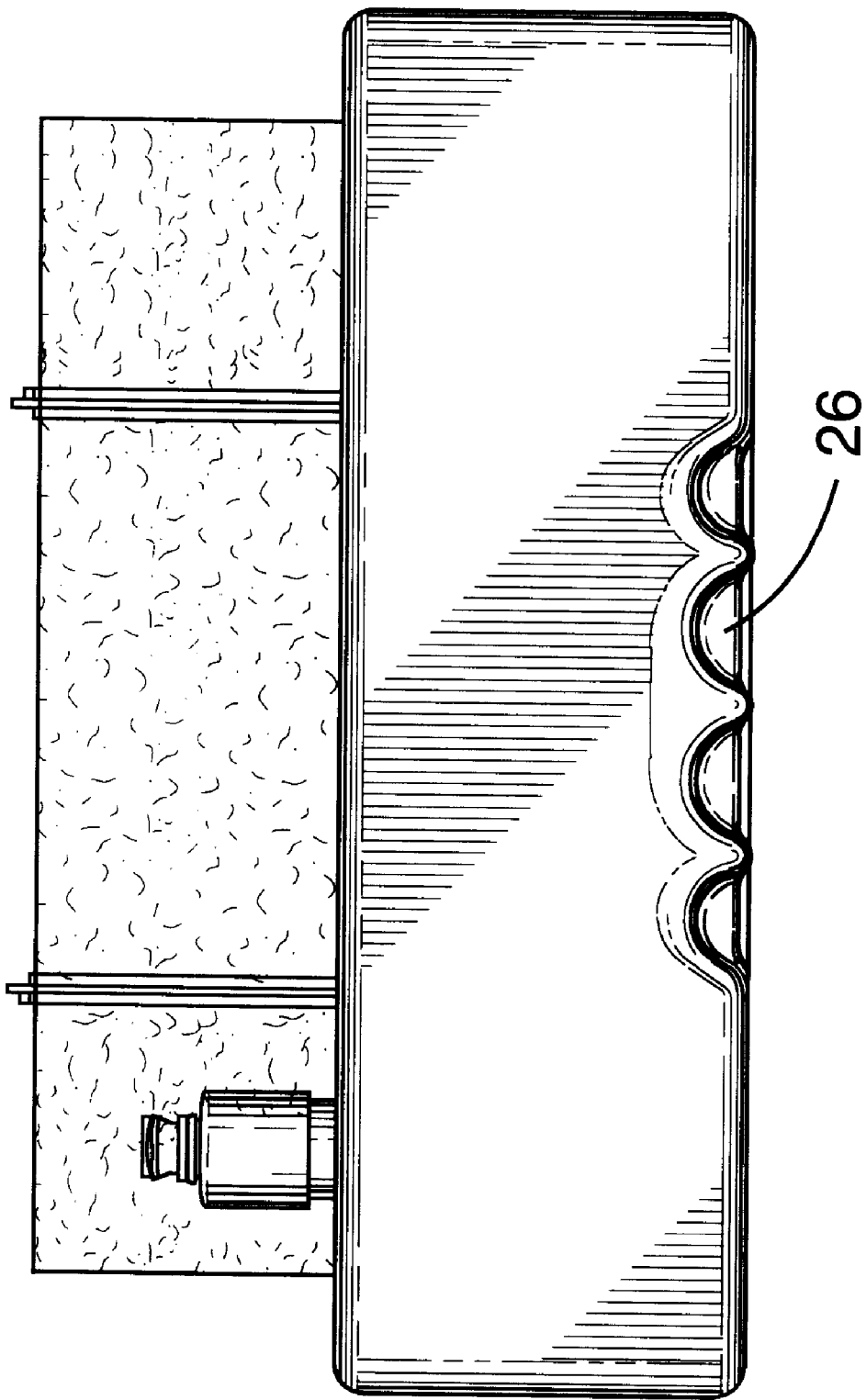
FIG. 2 is a rear view of the display holder with two floral foams and U-clips attached.
Figure 6:
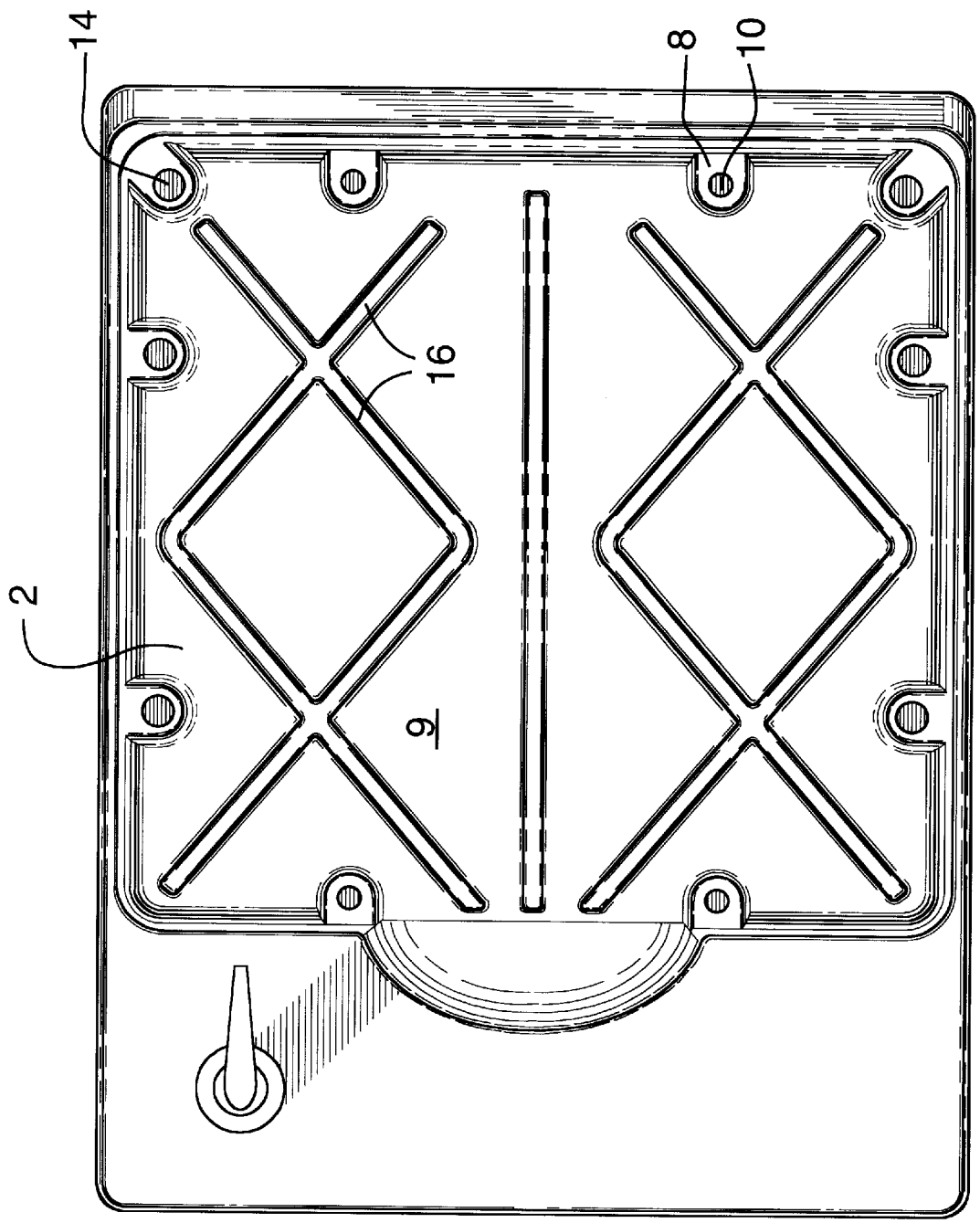
FIG. 6 is a plan view of the display holder without the floral foams inserted and U-clips attached.
Figure 7:
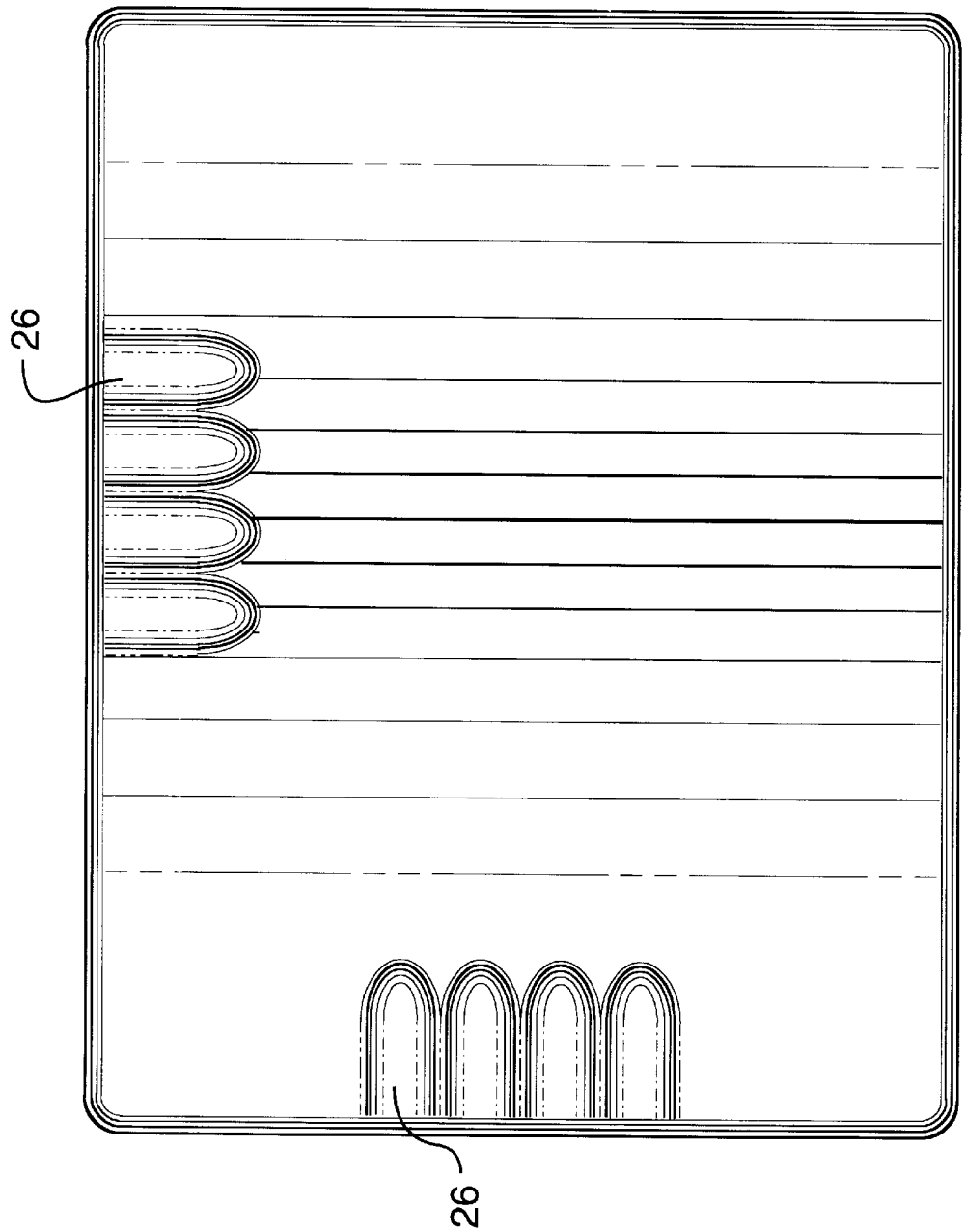
FIG. 7 is a bottom view of FIG. 2.
Figure 8:
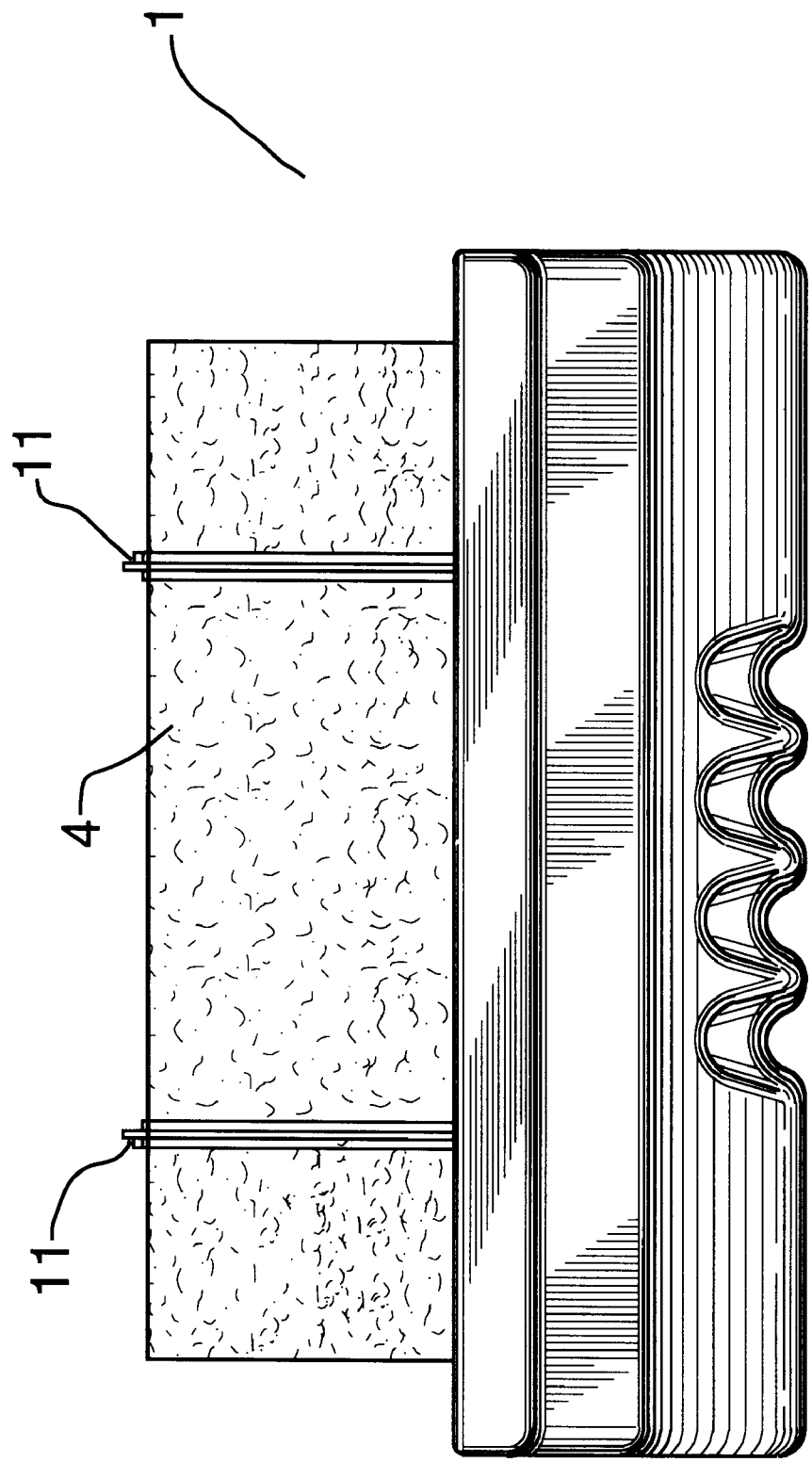
FIG. 8 is a front view of FIG. 2.

The accompanying drawings show the preferred embodiment of the floral display holder, generally referenced by numeral 1, formed from a hollow housing (as shown in FIG. 1) by any suitable process such as blow molding. With reference to FIG. 6, the housing 1 has a foam receiving recess 2 on its top surface to allow the insertion of floral foams 4 as shown in FIG. 1. The foams rest side by side abutting each other along their length.

Figure 4:
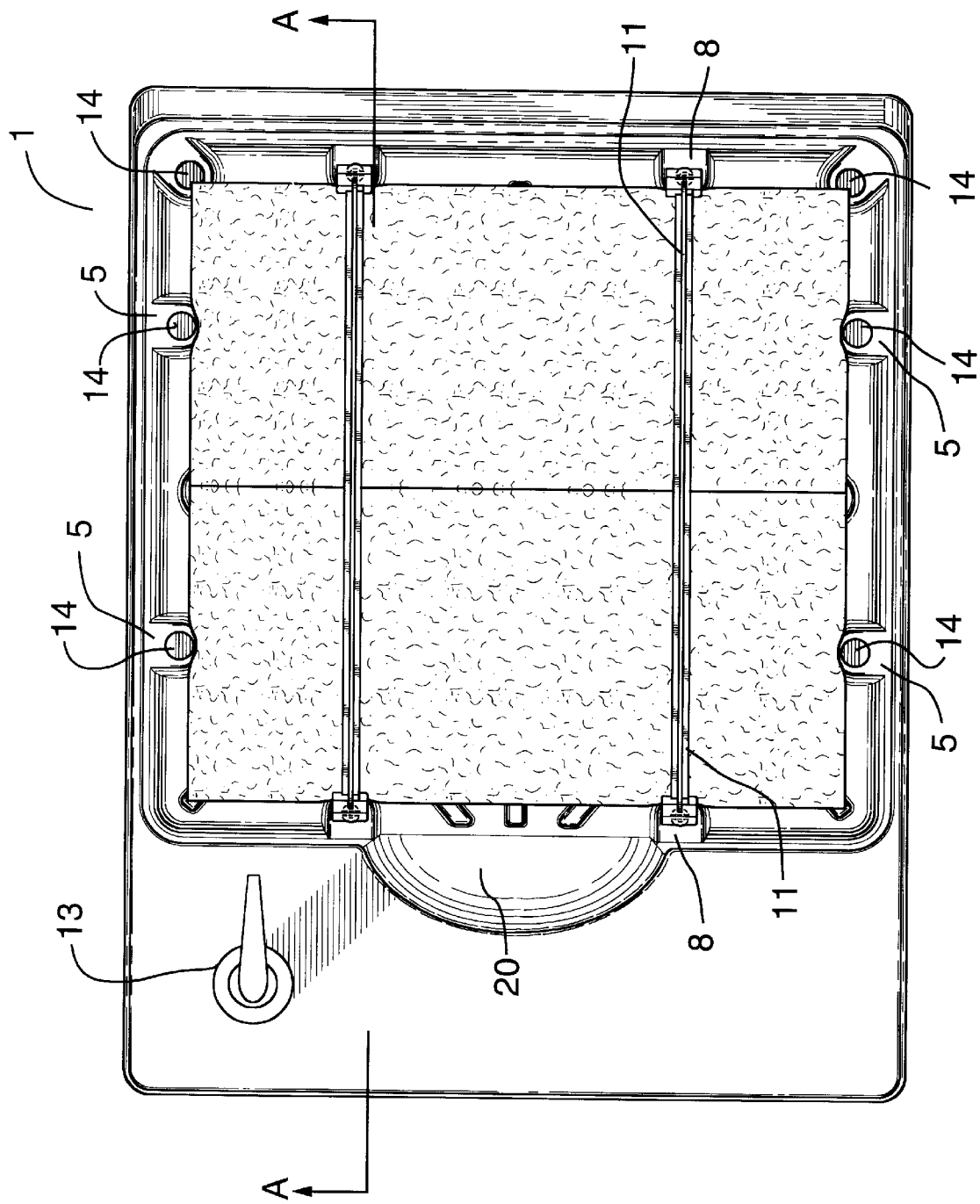
FIG. 4 is a plan view of the display holder with the floral foam inserted and U-clips attached.
Figure 5:
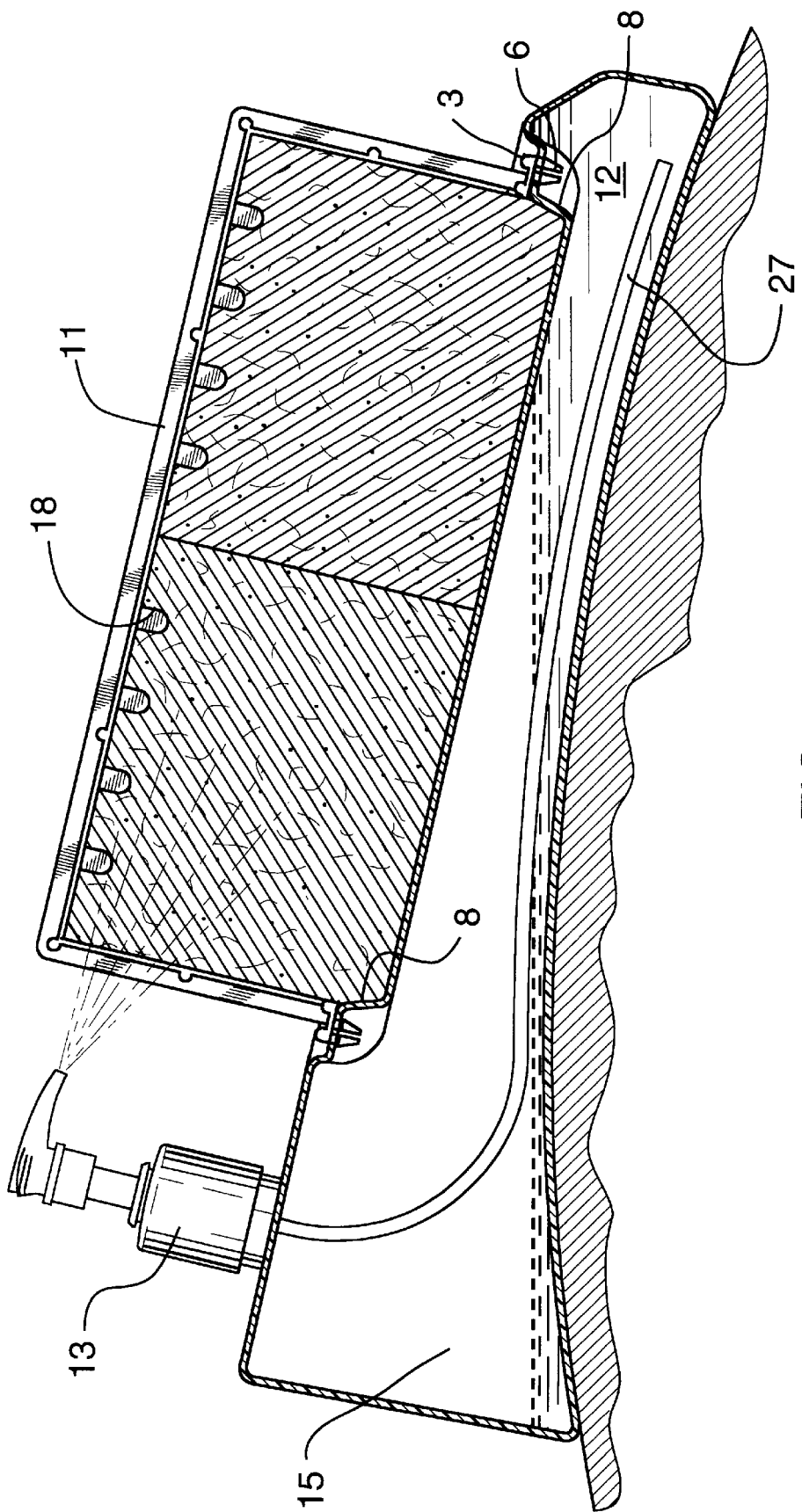
FIG. 5 is a cross-sectional view along line A—A of FIG. 4.

Returning to FIG. 6, each front and rear wall of recess 2 has, in the preferred embodiment, two lateral half-cylindrical protrusions 8 extending from the recess floor 9 approximately half way up the walls. Directly opposite to one set of protrusions 8 are another set of corresponding protrusions located on the opposing wall. Each protrusion has clip receiving apertures 10. As shown in FIGS. 4 and 5, a pair of opposing protrusions receive the ends of U-shaped clips 11 into the apertures. The end of the U-shaped clips are locked into the protrusions by applying pressure onto thumb rests 3. As a result of the pressure the one-way inserts 6 snap into the apertures. The head of insert 6 has a slightly larger diameter than the aperture diameter while the diameter of the neck of the insert is slightly smaller than the apertures diameter. This shape of the insert securely retains the floral foams in the recess despite a heavy load applied on the U-shaped clips. The U-shaped clips also have teeth 18 disposed along the horizontal bar. The teeth assist in preventing the foam from shifting down the inclined surface.

In the preferred embodiment, the floral foams are of a size, as shown in FIG. 4, to allow the outer side surfaces of the foams when inserted into the recess to be pinched by protrusions 8 and lateral protrusions 5, but of a size so as not to come into contact with any wall. The pinching effect assists in securing the position of the floral foams and provides for additional narrow lateral pockets to collect and pool excess water from the foams.

As shown in FIG. 4, a filling area 20 is provided in the preferred embodiment at the top rear portion of the housing. The filling area 20 is concave in shape and is adapted to merge with the planar floor surface 9. The shape and location of the filling area advantageously allows: water to be added to the floral foams without necessarily wetting the floral arrangement directly; for an even distribution of water to the floral foams; and, for the top foam, which generally is the foam that dries first, to be replenished with water first.

Figure 9:
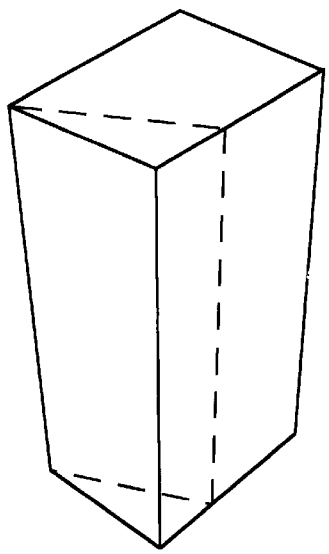
FIGS. 9, 10 and 11 are illustrations of how the prior art required the floral foam to be trimmed; and, FIG. 12 is a perspective view of the cascading prior art floral display holder.
Figure 10:
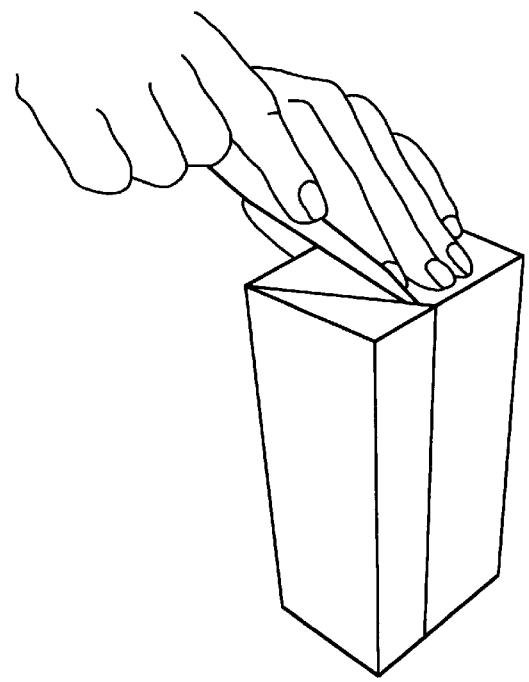
Figure 11:
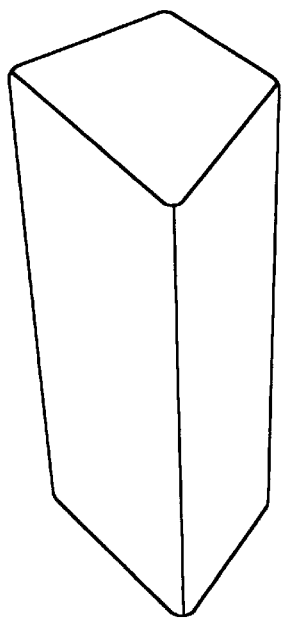
Figure 12:
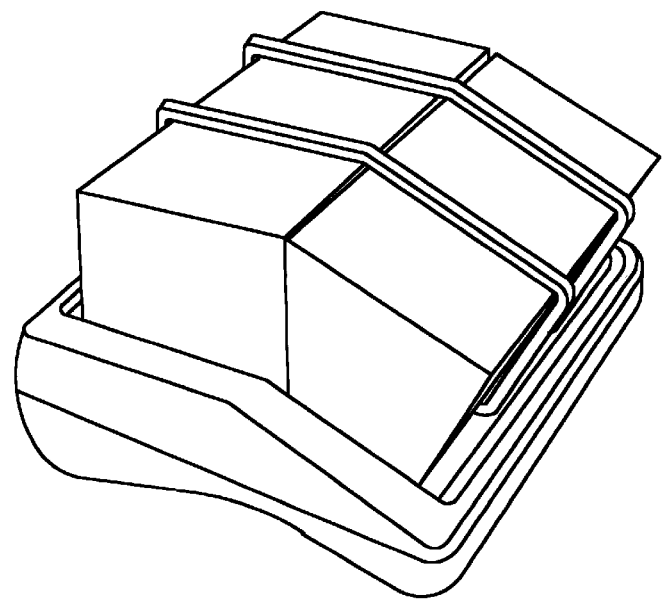

With reference to FIG. 5, the planar floor surface is at a higher elevation along the rear of the recess area than at the front of the recess area. This continuous planar inclination of the floor surface of the recess is essential to the invention. The resulting profile provides for a desirable preset in inclined display for more favourable viewing of the floral arrangement when the display rests on a casket. The drainage openings 14 allow excess water to drain into the water reservoir 15. In addition, the planar inclination overcomes the drawback in the prior art of having a broken cascade of floral foams as shown in FIG. 12. To achieve the inclined appearance of the floral foam, the prior art required the foam to be trimmed as shown in FIGS. 9 to 11. In contrast, the present invention advantageously allows the user to set up the display holder without the hassle and additional labour of cutting and trimming the floral foams. Furthermore, the present invention advantageously allows the foams to consistently rest side by side without forming an undesirable gap between the foams. FIG. 12 illustrates the undesirable gap between the saturated foams that occurs in the prior art.

In the preferred embodiment, the floor surface 9, as shown in FIG. 6, has a series of reservoir channels 16 recessed therein. The channels allow any excess water in one area of the foam to flow to a drier portion, and to allow water to wick upwardly into the block from the channels. When the reservoir area of any one channel cannot accommodate any further volume of water to store, the excess water simply migrates down the inclined surface floor 9 towards the drainage openings 14.

With reference to FIG. 5, the hollow housing defines a reservoir 15. The reservoir has a capacity to store, in the preferred embodiment, at least one cup of water 12. Initially, the reservoir is filled with water for saturation purposes. Once a saturated foam is inserted into the recess 2 the reservoir begins to collect excess water from drain openings 14. Water stored in the reservoir may be advantageously pumped out of the housing through a tube 27 extending to the bottom of the reservoir. The other end of the tube connects to a manual pump dispenser 13 screwed onto a threaded pump opening (not shown) located on the rear surface of housing.

When the floral foams requires additional water, the user simply pumps pump 13 and the pump draws the water from the reservoir and re-saturates the foams 4 by spraying water directly onto the upper portion of the rear most foam. If the reservoir is depleted, additional water may be added into the reservoir by first unscrewing and removing the pump 13. The pump 13 is then reconnected and ready to dispense water again.

Figure 3:
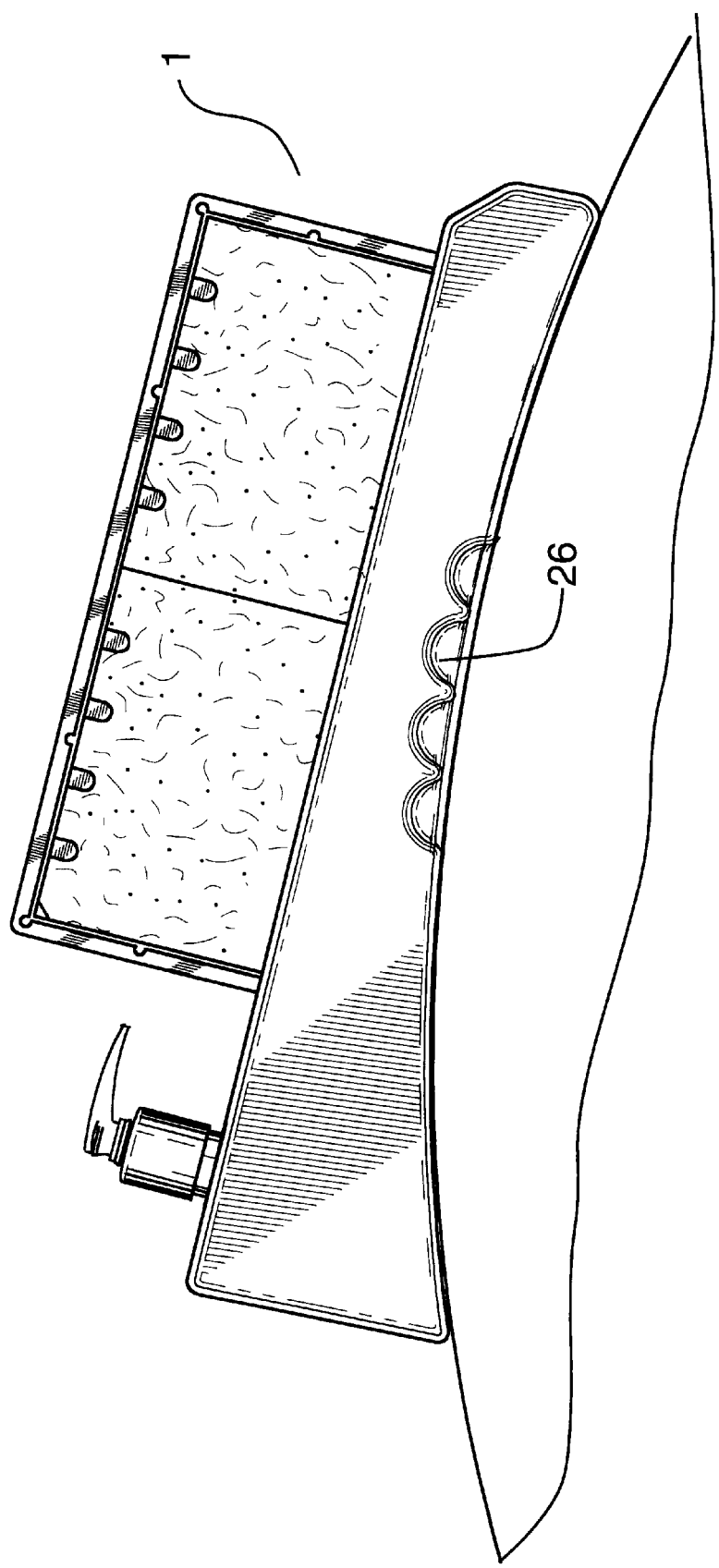
FIG. 3 is a side view of FIG. 2.

The profile view of the housing is best shown in FIG. 3. The profile is adapted to allow the floral display holder to rest or straddle the top of a funeral casket. Since most casket tops are of a convex shape the bottom surface off the housing, in the preferred embodiment, is concave in shape to allow it to securely rest on the casket top. As shown in FIGS. 2, 3, 7, and 8 the handgrips 26 consists of four finger rests integrally formed on the rear edge of the bottom surface of the housing. The floral display holder may be conveniently carried by slipping a hand into either or both the handgrips.

As result of the unique housing shape, more foam exposure allows for better design capabilities such as easier insertion and angling of flowers and greens.

It will be appreciated that the above description relates to the preferred embodiment by way of example only. Many variations on the invention will be obvious to those knowledgeable in the field, and such obvious variations are within the scope of the invention as described and claimed, whether or not expressly described.

In another embodiment of the invention a new floral display arrangement may call for an alternative shape of the floral foams such as an oval floral arrangement. In such a situation the housing will be of another shape to accommodate the foam insert. Despite a change in the shape of the housing the scope of this invention will encompass such change. Hence, the shape and proportions of the housing may vary widely depending on what the needs of the particular application calls for.

Another variation of the preferred embodiment may have the dispenser pump located in another location besides the top surface of the housing. In addition, instead of only one pump on the holder perhaps two pumps may be required in larger flower arrangements.

What is claimed as the invention is:

1. A floral display holder to hold floral foams, said holder comprising:
    a hollow housing, having an outer shell portion defining a liquid reservoir;
    a recess in an upper surface of said hollow housing defining an area to receive said floral foams, said recess having a substantially planar floor surface;
    at least one drainage opening for draining liquid from said recess into said liquid reservoir; and, means for securing at least one floral foam in the recess generally against said planar floor surface of the recess, wherein said recess has a planar floor surface inclined downwardly to a lower front end of said hollow housing, to provide an inclined arrangement of said at least one floral foam, and wherein said floral display holder further comprises a manual pump attached to a higher rear end of said hollow housing, said pump being arranged to draw liquid from said liquid reservoir through a tube running from said manual pump to a lower end of said reservoir, and to let out liquid onto said at least one floral foam secured in said recess or into said recess itself.

2. A floral display holder as claimed in claim 1, wherein said hollow housing has a cross-sectional profile defined by a bottom wall of said housing having a concave shape, which cross-sectional profile is adapted to enable said housing to straddle the top surface of a concave surface, such as a funeral casket, when said hollow housing rests thereon.

3. A floral display holder as claimed in claim 1, wherein said planar floor surface has a plurality of recessed liquid reservoir channels, to allow any excess liquid in one area of said at least one floral foam to flow to a drier portion, and to allow liquid to wick upwardly into said at least one floral foam from the channels.

4. A floral display holder as claimed in claim 1, wherein the means for securing said at least one floral foam comprises at least one Un-shaped clip.

5. A floral display holder as claimed in claim 4, wherein the at least one U-shaped clip comprises:

a horizontal arm having a set of teeth for gripping said floral foam, each free end of the U-shaped clip having a thumb rest, a neck, and a fastening head; and, at least two fastening head and neck receiving apertures on the housing, thereby holding said at least one floral foam securely in said recess while said floor surface is inclined in various positions.

6. A floral display holder as claimed in claim 1, wherein said floral display holder includes at least one hand grip means to assist a user in transporting a completed floral arrangement.

7. A floral display holder as claimed in claim 6, wherein said at least one handgrip consists of four finger rests integrally formed on a rear edge of said bottom wall of said hollow housing.

8. A floral display holder as claimed in claim 1, wherein said hollow housing includes a filling area extending outwardly from said recess towards said higher rear end of said hollow housing, said filling area having an upper surface angled slightly downwardly towards said recessed liquid channels.

* * * * *